Jan. 2, 1951  J. A. KINGSTON  2,536,752
MILK COOLING DEVICE
Filed April 11, 1945  2 Sheets-Sheet 1
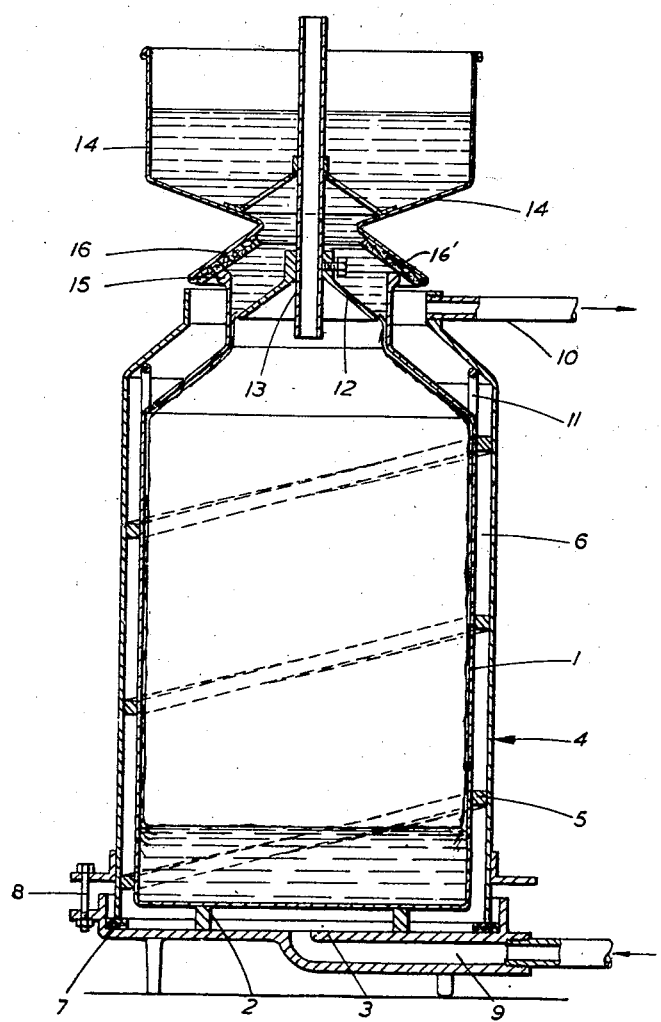
Inventor
J. A. Kingston
By
E. F. Wenderoth
Attorney Jan. 2, 1951  J. A. KINGSTON  2,536,752
MILK COOLING DEVICE
Filed April 11, 1945  2 Sheets-Sheet 2
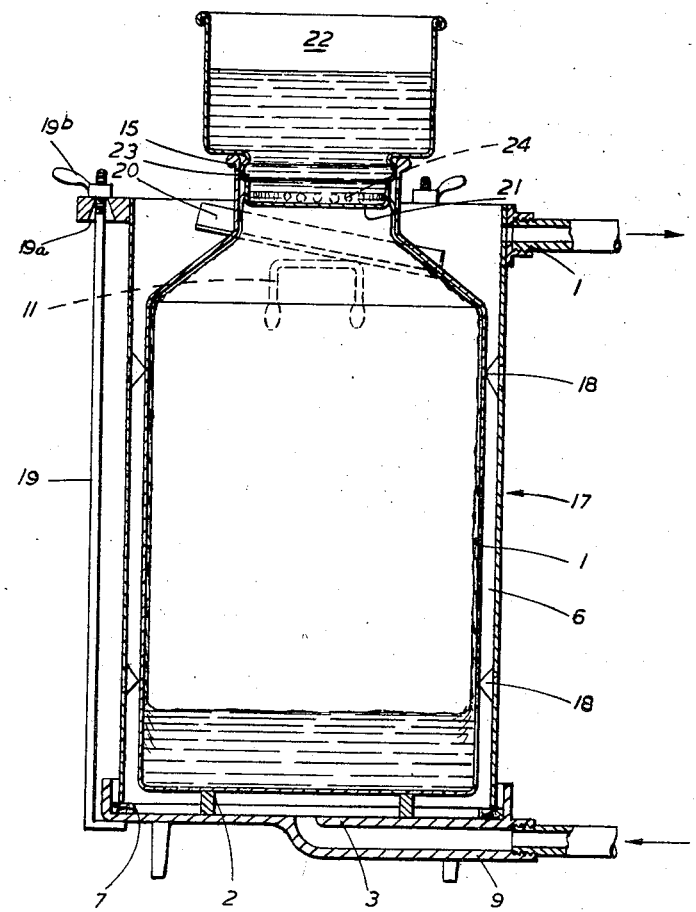
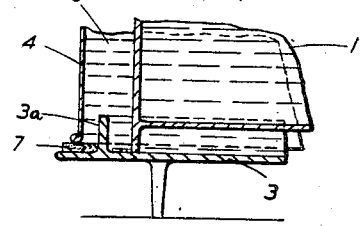
Inventor
J. A. Kingston
By
E. F. Osenderoth
Attorney Patented Jan. 2, 1951

2,536,752

UNITED STATES PATENT OFFICE 2,536,752

MILK COOLING DEVICE

Jonas Arthur Kingston, Tilehurst, England, assignor to Gascoignes (Reading) Limited, Reading, England, a British company Application April 11, 1945, Serial No. 587,693
In Great Britain April 4, 1944

2 Claims. (Cl. 257—208)

This invention relates to the cooling of milk and has particularly in view an improved method of and apparatus for cooling the milk delivered into a milk container or churn of known form in which the milk is normally transported. The invention is especially applicable to use with the known form of large container or so-called churn or can into which milk is delivered from automatic milking equipment working on the vacuum principle. The invention is, however, applicable also to the cooling of milk in containers into which the milk has been poured from pails into which it has been drawn by hand milking or by machine milking.

The object of the invention is to provide apparatus of great efficiency and simplicity for the cooling of milk. A further object of the invention is to provide apparatus constructed and arranged so that the cooling can be effected as the milk enters the container or churn in which it is afterwards normally transported.

According to the present invention the milk cooling device consists of a cooling-liquid jacket composed of two separable parts, one being a base plate onto which the milk container may be centrally deposited and the other being an upstanding enclosing wall adapted to be passed over the milk container and become seated upon the base plate, in spaced relation to the container, said jacket being provided with means for passing cooling liquid into and out of the intervening space and with means for ensuring a liquid-tight joint between the separable parts of the jacket.

The cooling liquid may be made to traverse the annular space between the milk container and the jacket wall either in an upward direction or in a downward direction, and the milk to be cooled may be charged into the container in bulk from milk pails in the usual way, but preferably as a flowing film spread upon the internal surface of the said container so that it undergoes extensive cooling as it is descending.

In order to determine a symmetrical spacing of the milk container and the cooling jacket, location means such as one or more annular ribs or the like on the face of the base plate may be provided. Alternatively, or in addition to such annular ribs, one or more spacing ribs or distance pieces or a long spiral rib may be provided externally on the wall of the container or internally on the cooling jacket wall; in the case of a spiral rib it also serves to prolong the path of flow of the cooling liquid. Container-locating means on the cooling jacket wall are preferred as this enables existing milk containers or churns to be employed. Means will also generally be required to hold down the container when empty from being buoyed up by the cooling liquid, and for this purpose it is convenient to provide means such as sloping stop plates on the internal surface of the cooling jacket wall for co-action with the handles of the container.

In order to spread the entering milk as a film on the internal surface of the milk container, various distributing devices may be employed for fitting over or into the mouth or open end of the container. Such a device may, for example, comprise a cone, the peripheral edge of which at the base is situated within a short distance of the internal surface of the container just within the mouth or upper end thereof, so that the milk flowing over the cone will spontaneously shoot in film form onto the container wall. Another form of distributing device consists of a pan or tray insertable into the container mouth and perforated so that the milk escapes from the pan or tray as a multitude of fine jets or streams directed against the container wall.

Embodiments of the invention using the two forms of distributors above referred to and employing two different jacket constructions will now be described by way of example, with the aid of the accompanying drawings, in which Figure 1 is a vertical sectional elevation of a milk churn in position within a cooling device and being fed with milk in accordance with the present invention. Figure 2 illustrates certain modifications of the construction of Figure 1, and Figure 3 is a fragmentary view illustrating a further modification concerned with the base of the jacket. Both forms of apparatus illustrated by Figures 1 and 2 of the drawings are intended for use with milk churns of known form, as commonly employed in transporting milk received from automatic vacuum milking equipment, and comprising a cylindrical body portion surmounted by a conical shoulder portion which in turn is surmounted by a cylindrical neck portion.

Referring first more particularly to Figure 1, the reference numeral 1 indicates a churn as above described, and the water cooling device consists of the base plate 3 and the upstanding jacket wall 4, the latter approximating in shape to the side wall, shoulder, and neck of the churn. The base of the churn rests on blocks 2 on the base plate 3. Within the jacket wall 4 is provided a spiral rib 5 which locates the churn 1 centrally within the wall 4 to provide a substantially uniform narrow space 6 between the churn and the jacket wall for the passage therethrough of cooling water. When the churn has been placed on the base 3, and the jacket wall 4 has been lowered over the churn into its enclosing position, the wall 4 is clamped on to a jointing ring 7 on the floor of the dish-like base plate 3 by means of clamping bolts 8 extending between flange rings mounted on the wall 4 and base 3 to provide a fluid-tight joint. A duct 9 in the base 3 and a duct 10 provided on the upper part of the jacket 4 serve as inlet and outlet respectively, or vice versa, of cooling liquid. As the jacket wall 4 is lowered into position on the base 3 over the churn, contact of the handles 11 of the churn with the shoulder of the wall 4 prevents the churn when empty from being buoyed up by the cooling water.

12 is a milk distributor of conical form supported on a central vent pipe 13 depending from a milk hopper 14. The milk hopper 14 is supported on the rim 15 of the mouth of the churn by means of a flared outlet 16 lined with a packing material 16' to form a fluid-tight connection between the outlet 16 and rim 15. The hopper 14 is positioned so that the conical distributor 12 has its peripheral edge disposed centrally within the churn mouth and situated within a short distance of the internal surface thereof. Milk poured into the hopper 14, as for example from automatic vacuum milking equipment, passes through the flared outlet 16 on to the conical distributor 12, over the edge of which the milk shoots as a flowing film which spreads over and flows down the internal surface of the churn. Simultaneously cold water under pressure is caused to flow within the space between the churn and the jacket wall to cool the churn wall. It is, of course, realized that the total area of the milk film inevitably decreases as the level of the accumulated milk rises in the churn, but even during the later stage of collection there is bulk-cooling of the milk owing to the continuous cooling effect of the external cooling stream. Similarly, of course, the cooling may be continued even after the churn is full of milk.

In the alternative form of apparatus illustrated in Figure 2, the jacket wall 17 of the cooling device does not conform to the upper part of the churn 1, but is of plain cylindrical form. A series of container-locating studs such as shown at 18 may be provided within the wall 17 which is clamped in fluid-tight manner to the base 3 by extended hook bolts 19. The upper end of the bolt 19 passes through a conical hole 19ª in the flange at the top of the wall 17 so that when the clamping nut 19ᵇ is slackened the lower end of the bolt can be swung clear of the base 3. Buoyancy of the churn 1 due to the filling of the annular space between the churn and the wall 17 is prevented by the handles 11 engaging under inclined stop plates 20. When the wall 17 has been lowered over the churn, the said wall is partially rotated to engage the handles 11 under the stop plates 20.

The milk distributor shown in this figure (Fig. 2) consists of a perforated pan or tray portion 21 depending from a milk hopper portion 22 supported on the rim 15 of the mouth of the churn.

The milk discharges from the lateral perforations 24 as fine lateral jets or streams which spread evenly over the internal surface of the churn and unite to form a continuous flowing film. If desired a filter may be fitted into the annular channel 23 above the perforated tray.

In the alternative construction shown in Figure 3, the jointing ring 7 is provided outside a centering annular rib 3ª on the base plate 3 instead of inside of the base plate rim as in Figures 1 and 2.

What I claim is:

1. A cooling jacket for milk containers of the type having a cylindrical body portion, a conical shoulder portion, a cylindrical neck portion and handles extending upwardly from said cylindrical portion and comprising a base member for supporting a milk container, a separable jacket member on said base member, said jacket member having a cylindrical body portion, a conical shoulder portion inwardly directed from said cylindrical body portion and a cylindrical neck portion, said jacket member being larger than said milk container but corresponding in shape thereto, said jacket member having an open lower end resting on said base member, fluid sealing means between said jacket and said base, cooling fluid inlet means in said base opening into said jacket, cooling fluid outlet means in said jacket and spacing means on the internal wall of said jacket for spacing said jacket and said milk container and forming a cooling fluid chamber therebetween, said jacket being placeable over said milk container on said base, after said milk container has been placed thereon, by passing said jacket over the top of said container onto said base, said conical shoulder portion on said separable jacket contacting the handles on said milk container and preventing said container from rising under the buoyancy effect of cooling liquid in the jacket.

2. A cooling jacket for milk containers as claimed in claim 1, said spacing means on said jacket comprising a spiral rib on the internal wall of said cooling jacket, said spiral rib forming a spiral cooling fluid passage between said jacket and said milk container for prolonging the flow of said fluid from said inlet to said outlet.

JONAS ARTHUR KINGSTON.

REFERENCES CITED

The following references are of record in the file of this patent:

UNITED STATES PATENTS

| Number | Name | Date |
|---|---|---|
| 939,021 | Hendrix | Nov. 2, 1909 |
| 1,398,787 | McLean | Nov. 29, 1921 |
| 1,850,500 | Goble | Mar. 22, 1932 |
| 2,060,496 | Glaser et al. | Nov. 10, 1936 |
| 2,293,041 | Borden | Aug. 18, 1942 |
| 2,391,876 | Brown | Jan. 1, 1946 |

FOREIGN PATENTS

| Number | Country | Date |
|---|---|---|
| 577,087 | Great Britain | May 3, 1946 |